United States Patent [19]

Lomax

[11] Patent Number: 4,838,902
[45] Date of Patent: Jun. 13, 1989

[54] SYSTEM AND METHOD FOR SELF-CLEANING BARRIER-TYPE AIR FILTER

[75] Inventor: Christopher P. J. Lomax, Arlington, Wash.

[73] Assignee: The Boeing Company, Seattle, Wash.

[21] Appl. No.: 152,036

[22] Filed: Feb. 3, 1988

[51] Int. Cl.$^4$ .............................................. B01D 46/04
[52] U.S. Cl. ...................................... 55/96; 55/302; 55/306; 55/337
[58] Field of Search ................... 55/96, 286, 287, 302, 55/306, 337, 424, 426

[56] References Cited

U.S. PATENT DOCUMENTS

| | | | |
|---|---|---|---|
| 3,221,477 | 12/1965 | Annoldi et al. | 55/75 |
| 3,277,633 | 10/1966 | Smoot | 55/302 |
| 3,645,400 | 2/1972 | Floyd | 201/108 |
| 3,841,065 | 10/1974 | Espeel | 55/284 |
| 3,887,341 | 6/1975 | Sutter | 55/96 |
| 3,906,798 | 9/1975 | Dray | 73/384 |
| 4,026,685 | 5/1977 | Grix | 55/213 |
| 4,213,437 | 7/1980 | Onofrio | 123/179 |
| 4,235,610 | 11/1980 | Richard | 55/302 |
| 4,272,262 | 6/1981 | Britt et al. | 55/302 |
| 4,278,454 | 7/1981 | Nemesi | 55/302 |
| 4,514,193 | 4/1985 | Booth | 55/290 |
| 4,537,608 | 8/1985 | Koslow | 55/337 |
| 4,592,765 | 6/1986 | Breitman | 55/306 |
| 4,702,071 | 10/1987 | Jenkins et al. | 55/306 X |

Primary Examiner—Charles Hart
Attorney, Agent, or Firm—Glenn D. Bellamy; Bruce A. Kaser

[57] ABSTRACT

Disclosed in an apparatus and method for self-cleaning a barrier-type air filter. In an aircraft, a filter may be located within an air delivery duct wherein normal airflow through the duct deposits airborne lint and the like on an upstream side of the filter. To clean the filter, an airflow discharge conduit interconnects the duct and the exterior of the aircraft from a position upstream of the filter. A valve is operatively positioned in the conduit for opening and closing the airflow path it creates. When both normal airflow is stopped and the valve is opened, a reversal of airflow through the filter takes place and the lint is removed therefrom.

5 Claims, 4 Drawing Sheets

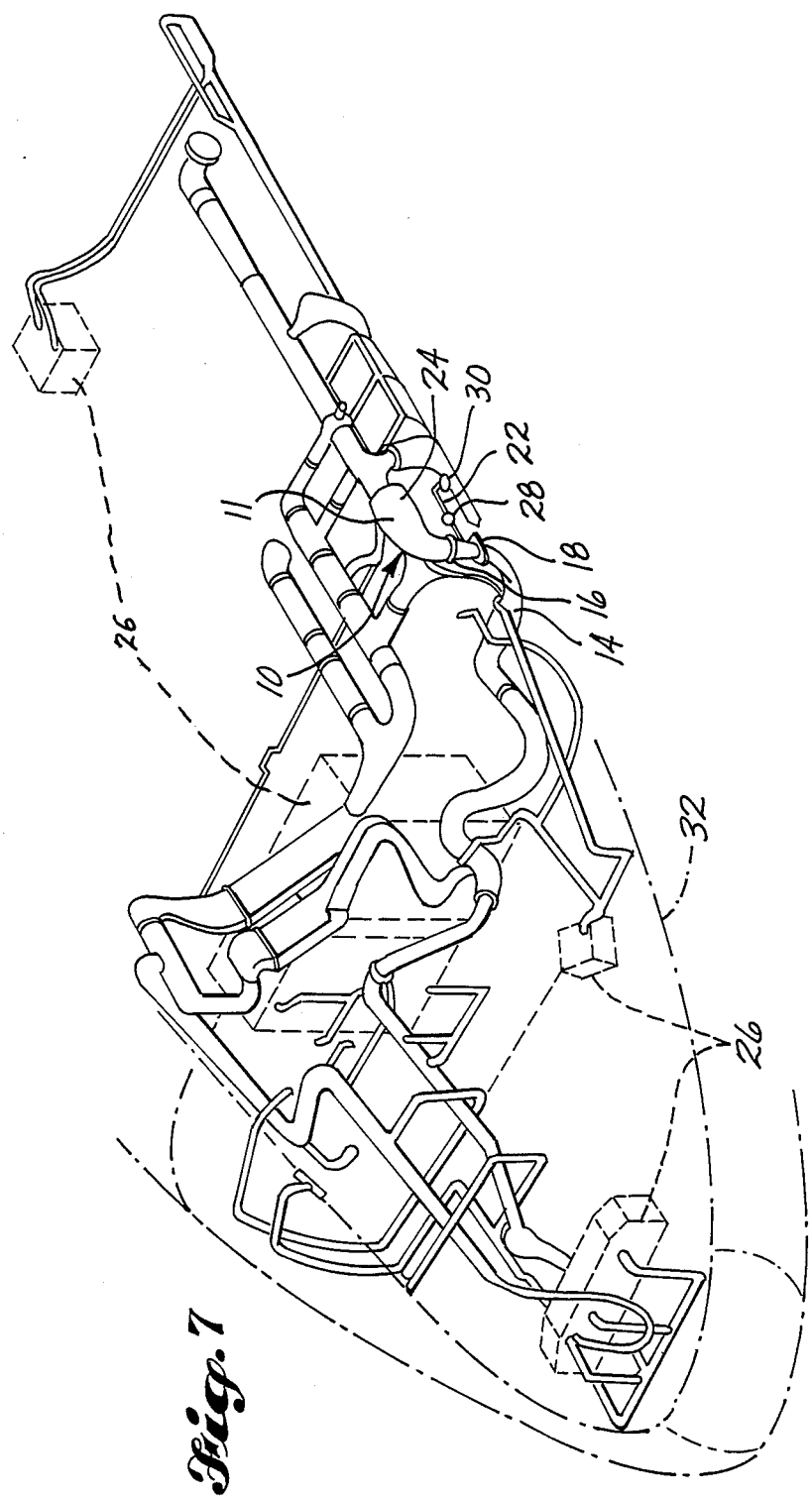

SYSTEM AND METHOD FOR SELF-CLEANING BARRIER-TYPE AIR FILTER

TECHNICAL FIELD

This invention relates to devices for cleaning air filters and, more particularly, to devices which clean barrier-type filters by reversing airflow through the filter.

BACKGROUND INFORMATION

Commercial aircraft typically incorporates a duct system for supplying cooling air to onboard electronic equipment. The cooling air is drawn from a variety of sources depending on aircraft operating conditions at any given time. Contained in the air are various unwanted materials including dust, dirt, sand, insects, hairs and lint. Usually, conventional barrier-type air filters are placed in system ducts in order to prevent these materials from being blown into the equipment. After a short period of time these filters become clogged with debris build-up which reduces the amount of cooling airflow. Lint, which is generated predominately from aircraft carpets and upholstery fabric, is especially a problem in this regard.

In view of the above, it is therefore necessary to clean clogged filters periodically so that potential electrical overheating problems are reduced. In the past, this has typically involved removing instrumentation panels, disconnecting cooling ducts, vacuuming the filters, and reconnecting everything which was disassembled. As will become apparent below, this maintenance procedure and its associated cost is eliminated by the present invention.

DISCLOSURE OF THE INVENTION

The invention accomplishes removal of barrier filter build-up by providing a discharge conduit that connects a cooling duct, from a position upstream of a barrier filter placed in such duct, to the outside of the aircraft. Positioned in this conduit is both a venturi and a valve. The valve is operable to open or close the airflow path created by the discharge conduit. In operation, normal airflow in the cooling duct is first stopped and the valve is then opened. The pressure differential between the cooling duct and the aircraft exterior results in an outward airflow through the discharge conduit, the amount of which is limited by the venturi. Since this air is drawn from the cooling duct, it causes a reversal of the normal airflow through the barrier filter and carries the build-up through the discharge conduit dumping it overboard. The valve is thereafter closed and normal operation of the cooling duct is resumed.

It is an aspect of the present invention that it eliminates the above-described maintenance problem associated with filter clogging. The preferred way of doing this is set forth below.

BRIEF DESCRIPTION OF THE DRAWINGS

In the drawings, like reference numerals are used to represent like parts throughout the various views, and wherein:

FIG. 7 is a pictorial view of an aircarft duct network which is used for cooling various aircraft components, with the forward fuselage and cockpit portion of the aircraft being shown in phantom lines.

BEST MODE FOR CARRYING OUT THE INVENTION

Figure 1:
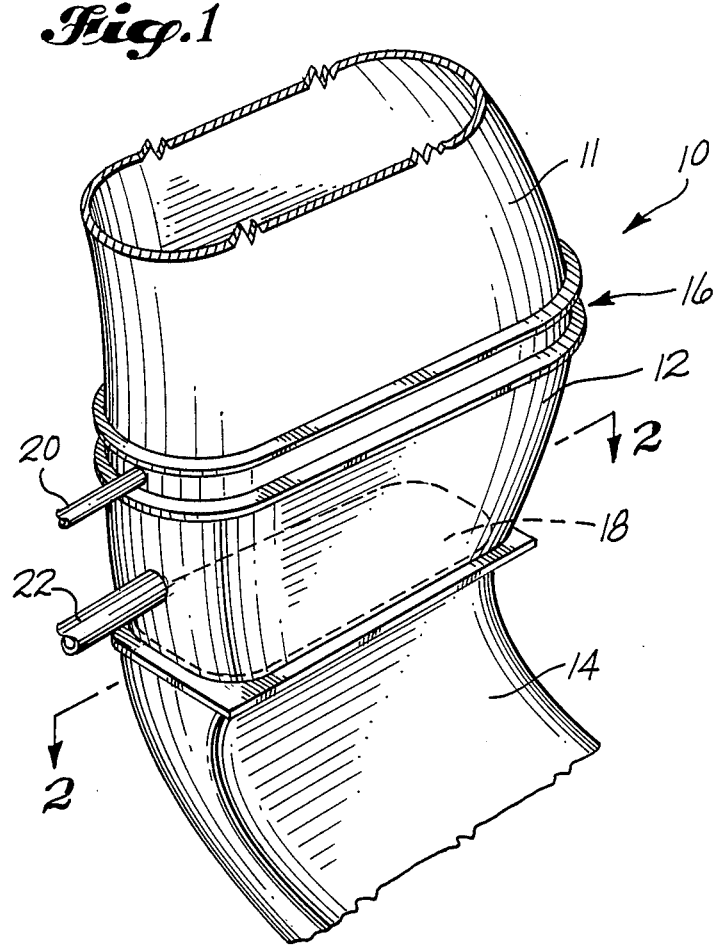
FIG. 1 is a fragmentary pictorial view of a typical portion of an air cooling duct on board an aircraft, and shows the position of a barrier-type filter and a discharge conduit in accordance with the present invention.
Figure 2:
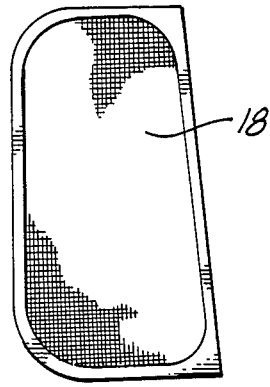
FIG. 2 is a cross-sectional view of the cooling duct shown in FIG. 1, and is taken along line 2—2 in FIG. 1.
Figure 3:
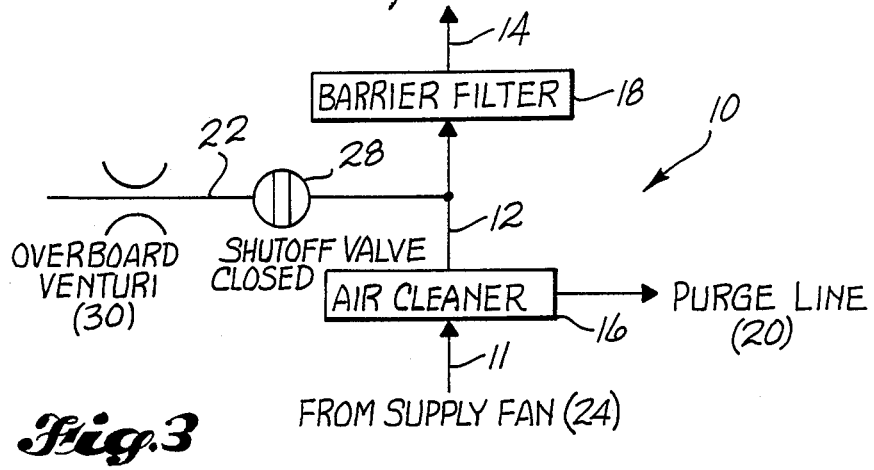
FIG. 3 is a schematic representation of one embodiment of the invention and illustrates normal airflow through an air cooling duct like the duct shown in FIG. 1.
Figure 4:
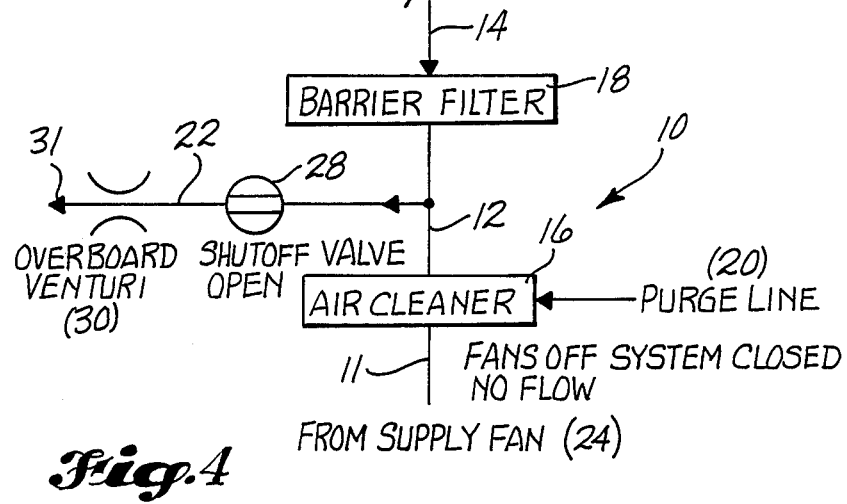
FIG. 4 is a view like FIG. 3 and illustrates how the invention operates to clean the filter.

Referring now to the drawings, and first to FIG. 1, therein is shown at 10 a portion of a typical air cooling duct used onboard an aircraft. By way of illustrative example, the duct may include a conventional centrifugal air cleaner, indicated generally at 16. This type of clean is well-known in the art, an example of which is disclosed in U.S. Pat. No. 4,514,193. As would be further known, the cleaner 16 includes a purge line 20 that is used to adjust airflow through it.

Also positioned in the duct 10 is a barrier-type filter 18. During normal operation, cooling airflow from an upstream portion of the duct 11 first passes through the centrifugal cleaner 16, and then through an intermediate duct 12 to the barrier filter 18. The centrifugal cleaner 16 removes a significant portion of spheroidal or cuboidal particles in the airflow. However, the cleaner is known to be generally less effective in removing fibrous materials such as hair and lint. Ultimately, most of these latter materials are deposted on the upstream side of the barrier filter 18.

A person skilled in the art would be generally familiar with the above-described structure and the operation of the same. In preferred form, the present invention provides an additional overboard airflow conduit 22 which is connected to intermediate duct portion 12 upstream of the filter 18. This conduit 22, which was referred to above as a "discharge" conduit, connects duct portion 12 to the exterior of the aircraft. A conventional venturi 30 is suitably positioned in the discharge conduit 22 and limits the amount of airflow therethrough. Also positioned in the conduit 22 is a shut-off valve 28. Opening or closing this valve likewise opens an airflow communication path through conduit 22. All of this is schematically shown in FIGS. 3–6.

Normally, the shut-off valve 28 is closed and cooling air flows through the duct 10 in the above-described manner. Such air is blown through the duct by any suitable blower device such as, for example, a conventional supply fan. This would be familiar to a person skilled in the art and is indicated schematically at 24. After passing through the air cleaner 16 and barrier filter 18, the airflow cools aircraft electrical components, which is schematically indicated at 26.

In order to practice the invention, the aircraft in which it is utilized must be in a moving and, preferably, flying condition. Then, if it is desired to clean the filter 18, the blower or fan 24 is first made inoperative. This, of course, means that normal airflow through the duct 10 is stopped. At that point, the shut-off valve 28 is open. The pressure differential between the aircraft's exterior and inside the duct 10 causes outward airflow through the venturi 30. This is indicated by arrow 31 in FIG. 4. With regard to the barrier filter 18, the normal direction of airflow is reversed which blows lint and other debris build-up from its normal upstream side and out through the conduit 22.

Figure 5:
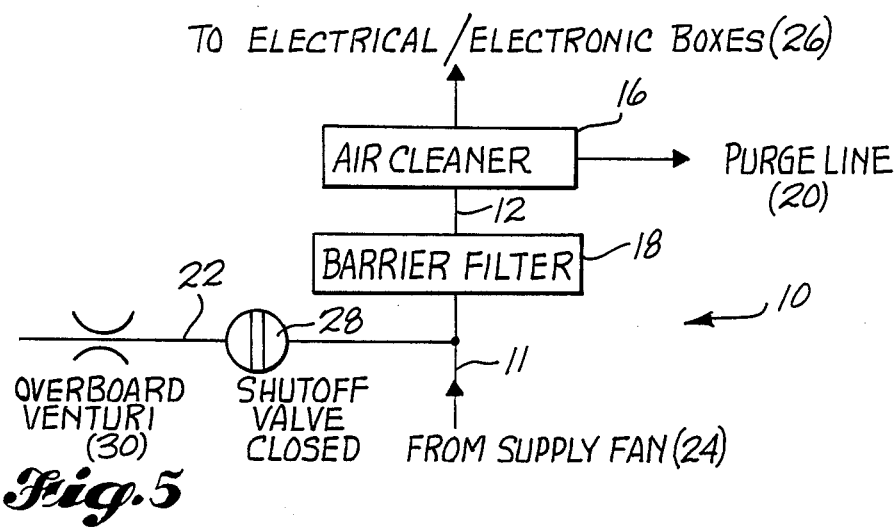
FIG. 5 is a schematic representation like FIGS. 3 and 4, but of another embodiment of the invention.
Figure 6:
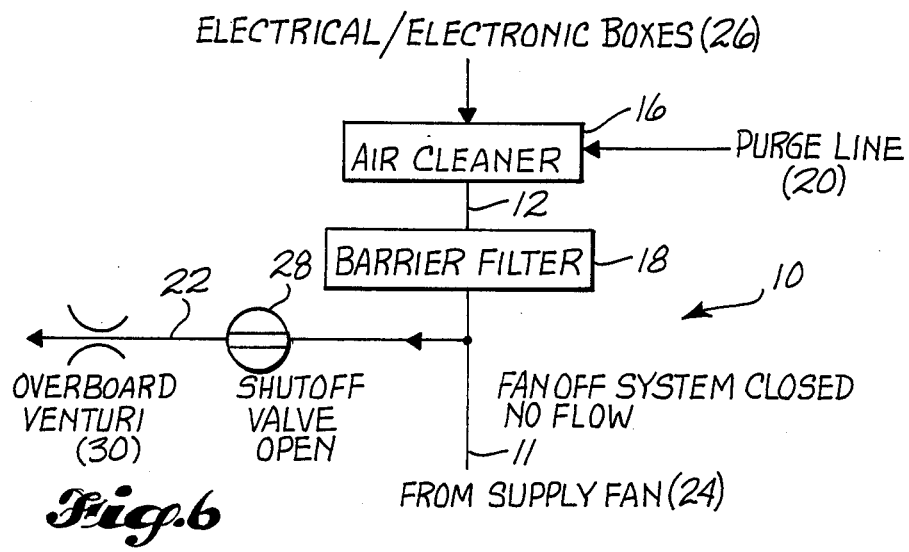
FIG. 6 is a view like FIG. 5 and illustrates how the invention operates to clean the embodiment shown in FIG. 5.

An alternate embodiment of the invention is illustrated in FIGS. 5 and 6. There, the centrifugal air cleaner 16 has been moved to a location that is downstream of the barrier filter 18. Although operation of the invention remains exactly the same, in this second embodiment when the supply fan 24 is made inoperative and the shut-off valve 28 is open, not only is airflow reversed through the filter but it is also reversed through the air cleaner 16. By way of comparison, in the first embodiment shown in FIGS. 3 and 4 the direction of airflow through the cleaner 16 always remains the same, even when the discharging debris through conduit 22.

FIG. 7 shows one possibly location of a filter cleaning system in accordance with this invention. A portion of a cooling air duct system is illustrated in this FIG., and the outline of an aircraft body 32 is shown in phantom lines. The size of the filter 18 need not, of course, be any larger than the cross-sectional area of a normal air duct. Also, because the lint accumulation is small, the discharge conduit 22 and overboard venturi 30 can also be relatively small. It is preferred that the filter 18 be located upstream of any flow sensors in the duct 14. It should be understood, however, the exact location is not critical. In some cooling systems, a separate filter 18 may be located in each of a plurality of divergent duct lines. If this is the case, only one discharge conduit 22 connected upstream of all of the filters may be adequate for filter cleaning.

The apparatus disclosed herein may be operated manually by pilot or crew, or automatically by an aircraft's computerized control system. The apparatus should be operated only as often as is necessary to prevent excessive debris build-up on a barrier filter 18. It is preferred that cleaning be done at the beginning of flight descent. This ensures that the near maximum pressure differential between the aircraft interior and the atmosphere may be utilized to provide adequate discharge airflow.

It is to be understood that the embodiment described above is the current best mode for carrying out the invention. It should be presumed the invention could be implemented in ways other than that which was described above without departing from the invention's spirit and scope. The embodiments illustrated and described above are merely examples of what is believed to be the best mode known at this time and, therefore, are not intended to be limitative. Therefore, any patent protection due the inventor is not to be determined by the above embodiments, but is to be determined only by a proper interpretation of the following claim or claims, wherein such interpretation is to be made in accordance with established doctrines of patent claim interpretation.

What is claimed is:

1. In an aircraft having a cooling air delivery duct and a filter within said cooling duct, wherein normal airflow through the duct deposits airborne lint and the like on an upstream side of the filter, an apparatus for cleaning said filter comprising:
   a discharge conduit interconnecting said cooling duct and the exterior of said aircraft, said conduit being connected to said duct at a position upstream of said filter and providing an airflow path from said duct to outside said aircraft;
   flow limiting means operably positioned in said discharge conduit; and
   valve means positioned in said discharge conduit and operable for opening and closing said airflow path provided by said conduit wherein a pressure differential between said cooling duct and outside of said aircraft is caused by aircraft movement, such differential causing reversal of normal airflow through said filter in response to operation of said valve means to open said airflow path, thereby causing said deposited lint and the like to be removed from said filter and carried through said discharge conduit to said outside of said aircraft.

2. The apparatus of claim 1, wherein said flow limiting means is a venturi.

3. The apparatus of claim 2, wherein said valve means is located in said discharge conduit between said venturi and said connection of said conduit to said duct.

4. In an aircraft having a cooling air delivery duct, an air blower device operable to provide a normal airflow through said duct, and an air filter in said duct, said filter being operable to permit said normal airflow to pass through said filter while blocking lint and like debris, said debris being deposited on an upstream side of the filter, a method of cleaning said filter comprising the steps of:
   causing said air blower device to become inoperative so that normal airflow through said filter is ceased; and
   causing airflow between said air delivery duct and the outside of said aircraft, from a position in said duct normally upstream of said filter, such airflow causing a reveral of airflow through said filter, thus removing said debris from said filter and causing it to be carried and expelled overboard.

5. In an aircraft having a cooling air delivery duct with a normal airflow in one direction through the duct, a self-cleaning filter apparatus, comprising:
   a barrier filter operably placed within said cooling duct, wherein normal airflow through the duct deposits airborne lint and the like on an upstream side of the filter;
   a discharge conduit interconnecting said cooling duct and the exterior of said aircraft, said conduit being connected to said duct at a position upstream of said filter and providing an airflow path from said duct to outside said aircraft; and
   valve means positioned in said discharge conduit and operable for opening and closing said airflow path provided by said conduit,
   wherein a pressure differential between said cooling duct and outside of said aircraft is caused by aircraft movement, such differential causing reversal of normal airflow through said filter in response to operation of said valve means to open said airflow path, thereby causing said deposited lint and the like to be removed from said filter and carried through said discharge conduit to said outside of said aircraft.

* * * * *

UNITED STATES PATENT AND TRADEMARK OFFICE
CERTIFICATE OF CORRECTION

PATENT NO. : 4,838,902

DATED : June 13, 1989

INVENTOR(S) : Christopher P. J. Lomax

It is certified that error appears in the above-identified patent and that said Letters Patent is hereby corrected as shown below:

On the title page:

In the Abstract, first line, "in" should be -- is --.

Col. 2, line 26, "clean" should be -- cleaner --.

Col. 3, line 21, delete "the".

Col. 3, line 23, "possibly" should be -- possible --.

Claim 4, col. 4, line 40, "reveral" should be -- reversal --.

Signed and Sealed this

Twenty-second Day of May, 1990

Attest:

HARRY F. MANBECK, JR.

Attesting Officer

Commissioner of Patents and Trademarks